United States Patent
Schoner et al.

(10) Patent No.: US 6,493,506 B1
(45) Date of Patent: Dec. 10, 2002

(54) OPTICAL DISK SYSTEM AND METHOD FOR STORING DISK- AND USER-SPECIFIC SETTINGS

(75) Inventors: Brian F. Schoner, Fremont, CA (US); Darren D. Neuman, Palo Alto, CA (US); Brett J. Grandbois, Fremont, CA (US); Christopher Cubiss, Menlo Park, CA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/109,025

(22) Filed: Jul. 1, 1998

(51) Int. Cl.[7] .............................. H04N 5/85; H04N 5/90
(52) U.S. Cl. ....................................... 386/126; 386/125
(58) Field of Search .................................. 386/126, 125, 386/124, 109, 111, 112, 105, 106, 96, 104, 27, 33, 45, 39, 46; H04N 5/85, 5/90

(56) References Cited

U.S. PATENT DOCUMENTS 5,977,964 A * 11/1999 Williams et al.
6,065,006 A * 5/2000 deCarmo et al.

* cited by examiner

Primary Examiner—Robert Chevalier
(74) Attorney, Agent, or Firm—Conley, Rose & Tayon

(57) ABSTRACT

An optical disk system is presented which stores disk- and user-specific settings, along with an associated method. The optical disk system includes a disk drive unit for retrieving identification data and encoded video data stored upon an optical disk, an input device for inputting user settings, and a microprocessor memory unit having a non-volatile portion for storing the identification data and the user settings. Information specific to optical disks (e.g., DVDs) and users is stored within the non-volatile portion of the microprocessor memory unit. The user settings may include, for example, spoken language, video display format, audio volume setting, and subtitle language. The user settings may be retrieved and invoked, conveniently allowing a user to view a presentation (e.g., a movie), or to continue viewing an interrupted presentation, without having to reselect viewing and listening preferences. The identification data may include a portion of a title of the optical disk. A value corresponding to the identification data (e.g., a checksum) may be stored in order to minimize storage requirements. The non-volatile portion of the microprocessor memory unit may include, for example, flash memory or electrically erasable programmable random access memory (EEPROM) which maintains stored contents even in the absence of applied electrical power. A sleep timer function may be activated which requires periodic user input to continue playback and to save a current playback location.

34 Claims, 3 Drawing Sheets

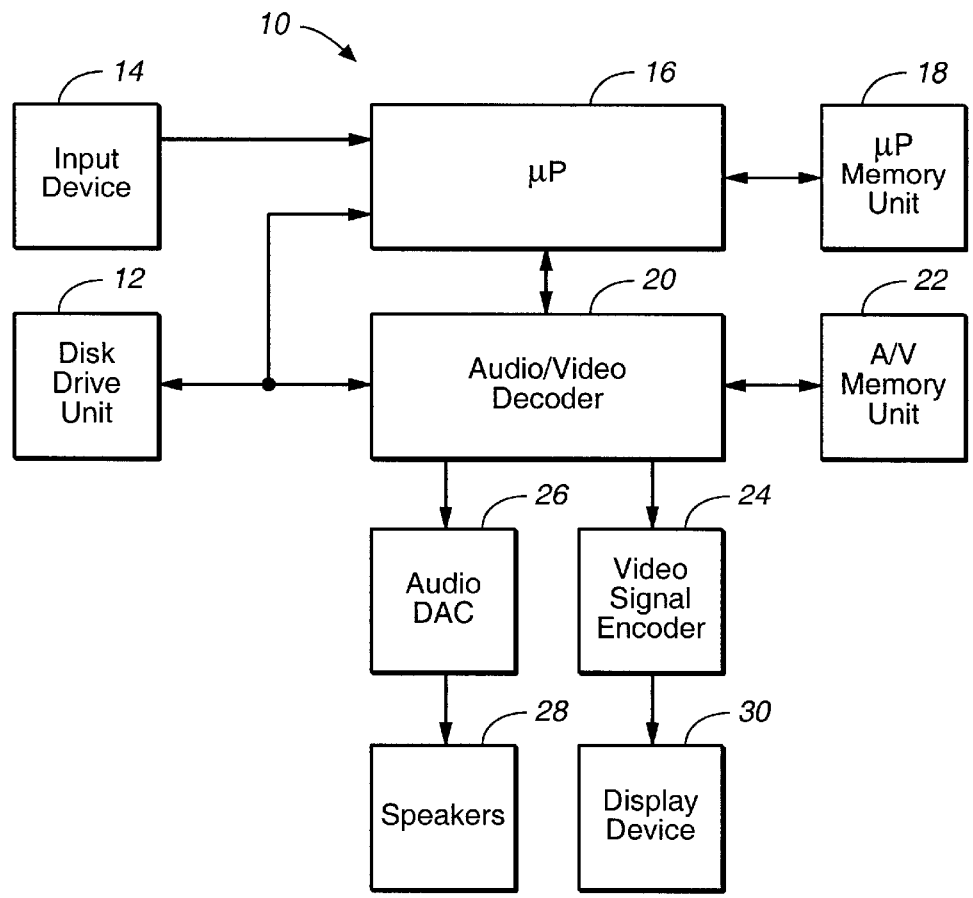
FIG._1
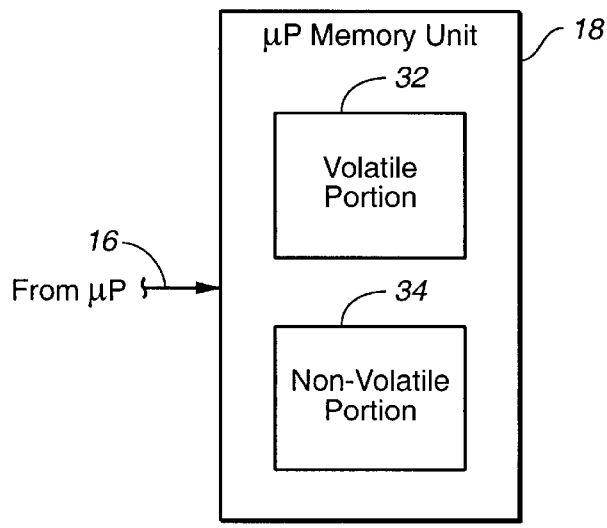
FIG. 2

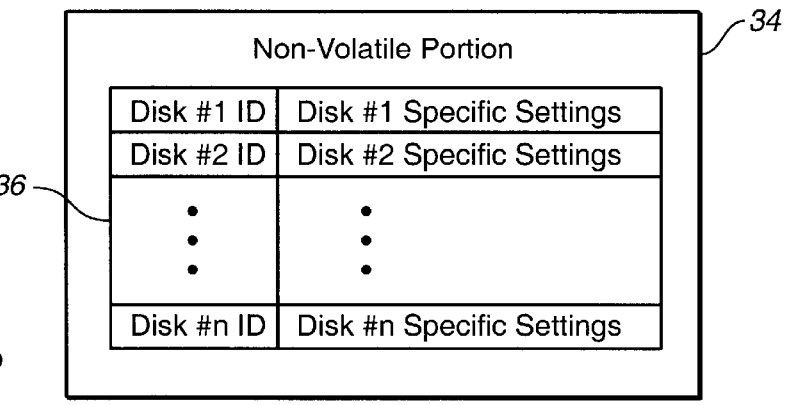
FIG._3
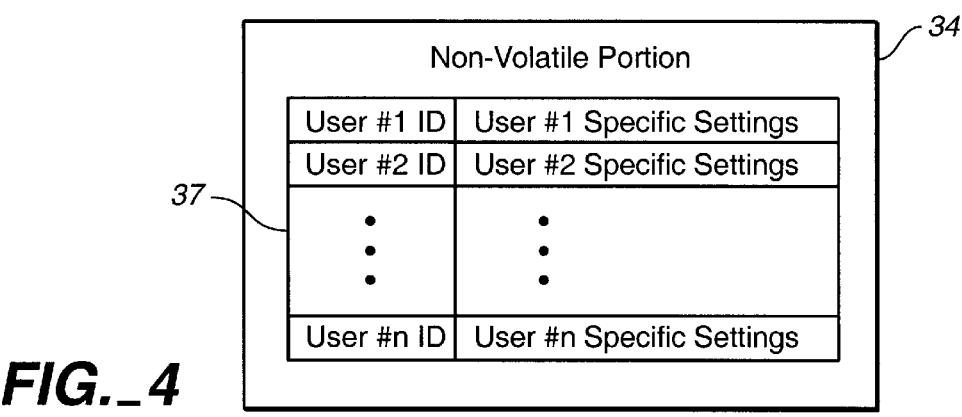
FIG._4
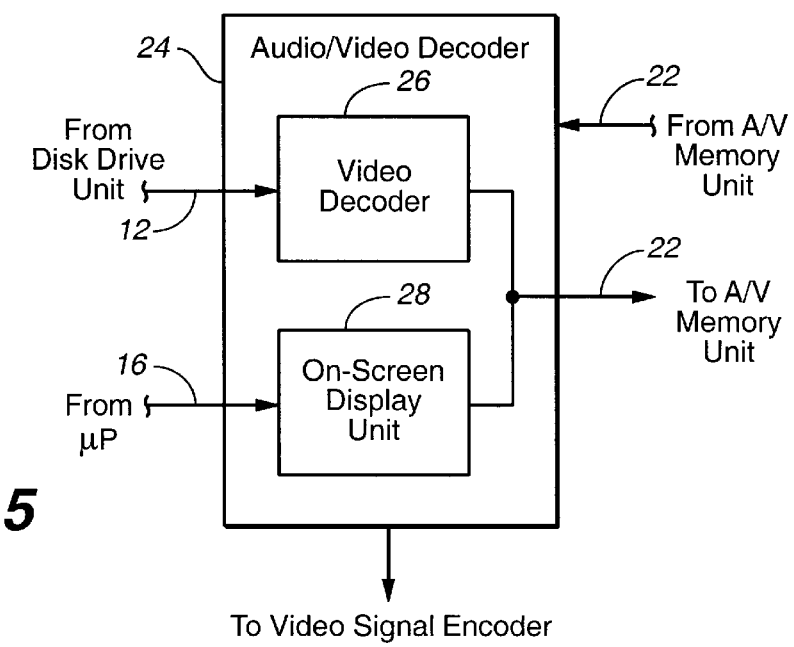
FIG. 5

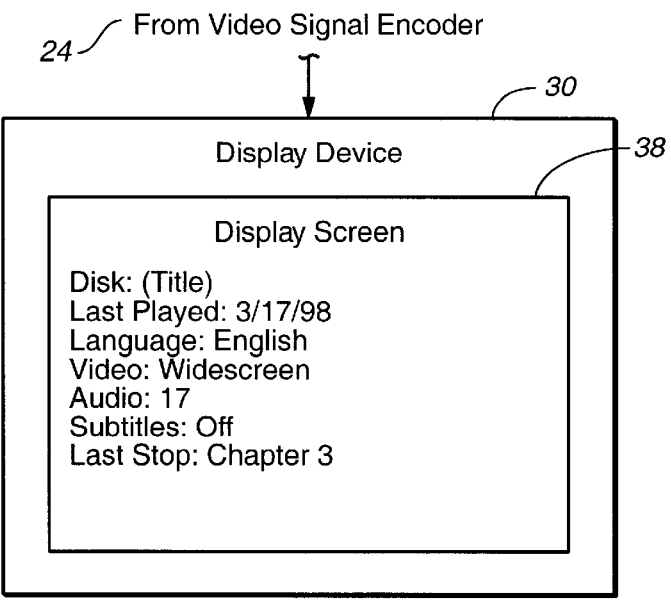
FIG._6
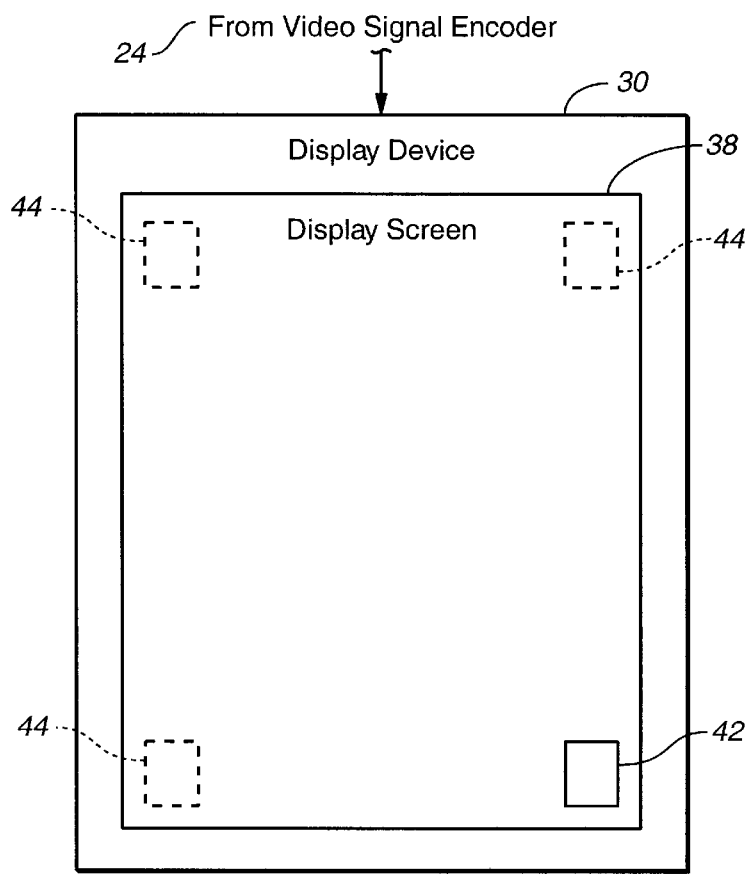
FIG._7

OPTICAL DISK SYSTEM AND METHOD FOR STORING DISK- AND USER-SPECIFIC SETTINGS

BACKGROUND OF THE INVENTION

1. Field of the Invention

This invention relates to optical disk systems, and in particular to optical disk systems which allow users to choose among a variety of playback viewing and listening options.

2. Description of the Related Art

Optical disks are recording media typically containing long strings of microscopic pits representing digitally encoded data. Each string of pits is called a "track". The tracks are formed end to end in a spiral pattern around the center of one or both major surfaces of the disk. Reflected laser light is used to "read" the data encoded in the pits. Common types of optical disks available today include compact disks (CDs), laser video disks, and digital versatile disks (DVDs). Various optical disk players are available which read data from optical disks.

The current DVD standard is a compromise format agreed upon by several major consumer electronic and entertainment companies. Under the current DVD standard, the capacity of a single side, single layer DVD with a diameter of 4.7 inches is 4.7 gigabytes, enough to store about 135 minutes of video data. This capacity is sufficient for about 95% of all full length movies. The current DVD standard also provides for up to eight different sound tracks in different languages, each with up to eight different audio channels to create a three-dimensional acoustic effect. In addition, up to 32 different sets of subtitles (i.e., translation text) may be stored on a DVD for display during playback.

By virtue of the numerous capabilities afforded by the DVD standard, a typical DVD player allows a user to select among a wide variety of viewing and listening options. The user typically makes these selections by navigating through several layers of menus displayed upon a television (TV) screen. For example, viewing options include display format, camera angle, and subtitles. A standard TV has a width-to-height (i.e., aspect) ratio of 4:3, while a widescreen TV has an aspect ratio of 16:9. Video data can be stored on a DVD for standard TV (4:3 display data) or widescreen TV (16:9 display data). DVD player display format options include full frame (4:3 format from 4:3 display data), letterbox (4:3 format from 16:9 display data), pan & scan (4:3 format from 16:9 display data), and widescreen (16:9 format from 16:9 display data). In letterbox format, a wide black stripe is added across the tops and bottoms of the 16:9 display data images such that proper proportions are maintained when the images are displayed upon a 4:3 screen. In pan & scan format, only 4:3 portions of the 16:9 display data images are displayed. Images "shot" from several different camera angles may be recorded on the disk, and the user may select any one of these camera angles for viewing. Subtitles in any one of up to 32 different languages may be superimposed upon portions of the images.

Audio options include language, number of channels, dynamic range, and volume. The user may select one of up to 8 different languages for playback. The user may also select desired values for number of audio channels, dynamic range, and volume. As described above, each of the up to 8 sound tracks in different languages may have up to 8 audio channels. Audio data encoded using Dolby® AC-3™ may have 1 to 5.1 channels. Audio data encoded using MPEG-2 audio may have 1 to 5.1 or 7.1 channels. Audio data encoded using pulse code modulation (PCM) may have 1 to 8 channels. A user may select from the various audio options present on a disk.

Users may have different viewing and listening preferences. Each user's preferences, however, would not be expected to change significantly over time. As a result, a typical user will most likely grow tired of having to reselect the same viewing and listening preferences each time a presentation (e.g., a movie) is viewed. It would thus be beneficial to have an optical disk system which stores information specific to each optical disk and/or user. Such a system would conveniently allow a user to view a presentation, or to continue viewing an interrupted presentation, without having to reselect viewing and listening preferences.

SUMMARY OF THE INVENTION

The problems outlined above are in large part solved by an optical disk system and method for storing disk- and user-specific settings. One embodiment of the optical disk system includes a disk drive unit for retrieving identification data and encoded video data stored upon an optical disk, an input device for inputting user settings, and a microprocessor memory unit operably coupled to the disk drive unit and the input device and including a non-volatile portion for storing the identification data and the user settings. Information specific to optical disks (e.g., DVDs) and users is stored within the non-volatile portion of the microprocessor memory unit. Such information may be retrieved and invoked, conveniently allowing a user to view a presentation, or to continue viewing an interrupted presentation, without having to reselect viewing and listening preferences.

The identification data may include a portion of a title of the optical disk. A value corresponding to the identification data may be stored within the non-volatile portion of the microprocessor memory unit in order to minimize storage requirements. The value may be, for example, an error detection code (e.g., checksum) computed from the identification data stored upon the optical disk.

The non-volatile portion of the microprocessor memory unit may include, for example, flash memory or electrically erasable programmable random access memory (EEPROM) which maintains stored contents even in the absence of applied electrical power.

The input device may include a keypad having multiple electrical pushbutton switches or "keys". The input device may be a "remote" control unit in wireless communication with the microprocessor (e.g., via an infrared light beam). A user may input user settings by pressing one or more of the keys of the keypad. The user settings may include, for example, spoken language, video display format, audio volume setting, and subtitle language.

The optical disk system may also include a microprocessor and an audio/video decoder. The microprocessor may be coupled to the disk drive unit and the microprocessor memory unit, and may be operably coupled to the input device. The microprocessor may receive the identification data from the disk drive unit and the user settings. The user settings may be retrieved from the non-volatile portion of the microprocessor memory unit. Alternately, the user input may be received via the input device.

The microprocessor may be configured to: (i) store the identification data and the user settings within the non-volatile portion of the microprocessor memory unit, and (ii)

provide the identification data and the user settings. The audio/video decoder may be coupled to the disk drive unit and the microprocessor. The audio/video decoder may receive the encoded video data from the disk drive unit and the identification data and user settings from the microprocessor. The audio/video decoder may decode the encoded video data thereby producing decoded video data, and may produce image data (e.g., bit-mapped textual data) which reflects the identification data and the user settings. The audio/video decoder may produce a video output signal which includes the image data superimposed upon the decoded video data.

The microprocessor may maintain a table including disk identification data and disk specific settings (e.g., user settings and last stop playback location information) within the non-volatile portion of the microprocessor memory unit. The table may have multiple entry locations, wherein each entry location corresponds to a specific disk and has a disk identification field and a specific settings field. The specific settings field may be used to store the user settings and last stop playback information associated with the disk identified by the data within the disk identification field.

The microprocessor may also maintain a table including user specific settings within the non-volatile portion of the microprocessor memory unit. The table may have multiple entry locations, wherein each entry location corresponds to a specific user and has a user identification field and a specific settings field. The specific settings field may be used to store the user settings associated with the user identified by the data within the user identification field.

When an optical disk is inserted into the disk drive unit, the microprocessor receives the disk identification data (e.g., textual title) from the disk drive unit. The microprocessor may search the table for an entry with matching identification data in the identification field. If an entry with matching identification data is not found, the user may be given the option of using settings stored within the table of user specific settings. If the table of user specific information is empty, or the user chooses not to use settings stored within the table of user specific settings, the microprocessor may prompt the user to enter viewing and listening preferences via the input device. If the user settings are entered via the input device, the settings may be stored within the table of user specific information. After the user settings are obtained, the microprocessor may initialize the last stop playback location to a beginning location. The microprocessor may select an entry location for the disk within the table of disk specific information, and store the identification data, the current calendar date, the last stop playback location, and the user settings within the entry location.

If an entry location with matching disk identification data is found, the microprocessor may retrieve the calendar date, the last stop playback location, and the user settings from the specific settings field of the entry location. The microprocessor may then provide the identification data, the calendar date, the last stop playback location, and the user settings to an on-screen display unit of the audio/video decoder. The on-screen display unit may produce the image data reflecting the disk identification data the calendar date, the last stop playback location, and the user settings. The identification data, the calendar date, the last stop playback location, and the user settings may then be displayed upon the display screen of the display device, and the user may be given the option of resuming playback from the last stop playback location and with the previously selected user settings. Resuming playback from the last stop playback location keeps the user from having to "hunt" through the presentation to determine a suitable location to resume playback. Allowing the user to resume playback with the previously selected user settings saves the user the time and trouble of reselecting viewing and listening preferences.

The present method for controlling the operation of the optical disk system includes obtaining identification data from the optical disk when the optical disk is inserted into the disk drive unit, obtaining user settings, and storing the identification data and the user settings within the non-volatile portion of the microprocessor memory unit. The disk drive unit may be used to scan the optical disk to obtain the identification data. The microprocessor may receive the identification data, and may search the table of disk specific information in order to determining if the optical disk has been inserted into the disk drive unit before. If the optical disk has been inserted into the disk drive unit before, the last stop playback location and the user settings may be retrieved and invoked. If the optical disk has not been inserted into the disk drive unit before, the user settings associated with the optical disk may be obtained from the table of user specific settings. Alternately, the user settings may be obtained via the input device. If the user settings are obtained using the input device, the user settings may be stored within the table of user specific settings. Once the user settings are obtained, retrieval of presentation data (i.e., encoded audio and video data) from the optical disk may be initiated.

If playback of the presentation data is stopped before an end of the encoded video and audio data on the optical disk is reached, the optical disk system may store the identification data, the user settings, and last stop playback location within the non-volatile portion of the microprocessor memory unit. The next time the optical disk is inserted into the disk drive unit, the information data, the user settings, and the last stop playback location may be displayed, and the user may be asked if playback should be restarted from the last stop point and with the previous audio and video settings.

A sleep timer function may also be employed to detect when a user falls asleep during playback. During playback, a visual signal (e.g., an icon) may be periodically displayed (e.g., every 30 minutes) within a portion of the display screen of the display device. The user may be required to respond to the visual signal (e.g., by pressing one or more keys of the keypad of the input device) within a predetermined amount of time (e.g., 5 minutes) in order for playback to continue. The visual signal may be displayed in, for example, a corner of the display screen. The time interval between displays of the visual signal may be determined by a first timer. Display of the visual signal may start a second timer which determines the required response time.

When a sleep timer mode is activated, the first and second timers may be enabled. The first timer may be activated when playback is initiated. When the first timer indicates a first predetermined period of time has elapsed (e.g., 30 minutes), the visual signal may be displayed and the second timer activated. The microprocessor may initiate display of the visual signal by providing data pertaining to the visual signal to the on-screen display unit. The on-screen display unit may produce image data and store the image data within an audio/video memory unit. The audio/video decoder may retrieve the image data from the audio/video memory unit, incorporate the image data into the output signal, and provide the output signal to the display device via a video signal encoder.

Each time the user responds to the visual signal via the input device within the predetermined time period of the second timer (e.g., 5 minutes), the microprocessor may store the identification data, the user settings, and the current playback location as the last stop playback location within the non-volatile portion of the microprocessor memory unit. The microprocessor may direct the on-screen display unit to stop producing image data. The visual signal disappears from the display screen of the display device, and playback continues.

If the user fails to respond to the visual signal via the input device within the predetermined time period of the second timer, the optical disk system assumes the user is asleep. The microprocessor stops playback and interrupts the supply of electrical power to the other components (i.e., shuts down the optical disk system). The non-volatile portion of the microprocessor memory unit holds the disk identification data, the user settings, and the last stop playback location stored the last time the user responded to the visual signal. The next time the disk is inserted into the disk drive unit, the user will be asked if playback should be continued from the location corresponding to the last time the user responded to the visual signal (i.e., just before the user fell asleep).

BRIEF DESCRIPTION OF THE DRAWINGS

Other objects and advantages of the invention will become apparent upon reading the following detailed description and upon reference to the accompanying drawings in which:

FIG. 1 is a block diagram of one embodiment of an optical disk system in accordance with the present invention, wherein the optical disk system includes a microprocessor memory unit having a non-volatile portion for storing disk and/or user specific settings;

FIG. 2 is a block diagram of one embodiment of the microprocessor memory unit of FIG. 1;

FIG. 3 is a block diagram of one embodiment of a table of optical disk specific information stored within the non-volatile portion of the microprocessor memory unit;

FIG. 4 is a block diagram of one embodiment of a table of user specific settings stored within the non-volatile portion of the microprocessor memory unit;

FIG. 5 is a block diagram of one embodiment of an audio/video decoder of the optical disk system of FIG. 1;

FIG. 6 is a block diagram of one embodiment of a display device of the optical disk system of FIG. 1, wherein the display device includes a display screen, and wherein exemplary image data produced by an on-screen display unit of the optical disk system is displayed upon the display screen; and FIG. 7 is a block diagram of the display device of FIG. 6 showing candidate locations for display of a visual signal upon the display screen, wherein the visual signal is used to determine if a viewer is asleep.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

FIG. 1 is a block diagram of one embodiment of an optical disk system 10 in accordance with the present invention. Optical disk system 10 includes a disk drive unit 12 for retrieving identification data, encoded video and audio data, and navigation data stored upon an optical disk. The optical disk may be, for example, a DVD. The optical disk may be placed within a designated area of a horizontal platform which slides in and out of disk drive unit 12. Alternately, disk drive unit 12 may have a slot for insertion of the optical disk.

The identification data stored upon the optical disk is used to identify the disk and may include a textual title. Alternately, when the optical disk is a DVD, each of the two sides of the optical disk is called a volume and has a primary volume descriptor. The primary volume descriptor includes several fields which could be used alone or in combination as identification data to identify the disk: (1) system identifier, 32 bytes; (2) volume identifier, 32 bytes; (3) volume set identifier, 128 bytes; (4) publisher identifier, 128 bytes (5) copyright identifier, 37 bytes; and (6) volume creation date and time, 17 bytes.

The encoded video data stored upon the optical disk may be, for example, digital video data compressed and encoded according to a Moving Pictures Experts Group (MPEG) standard (e.g., MPEG-2). The encoded audio data may be, for example, digital audio data compressed and encoded according to the Dolby® AC-3™ or MPEG-2 audio standard.

Optical disk system 10 also includes an input device 14 for inputting user settings. Such user settings include, for example, spoken language, video display format, audio volume setting, and subtitle language. Input device 14 may include a numeric keypad for inputting user settings.

Optical disk system 10 also includes a microprocessor 16 coupled to receive the identification data and navigation data from disk drive unit 12 as well as the user settings from input device 14. Microprocessor 16 also includes a timekeeping circuit which tracks the current calendar date including the month, day, and year. Microprocessor 16 is coupled to a microprocessor memory unit 18. Microprocessor 16 executes instructions stored within microprocessor memory unit 18 in order to control other functional units of optical disk system 10.

As will be described in detail below, microprocessor 16 stores the identification data and the user settings within a non-volatile portion of microprocessor memory unit 18. Each time an optical disk is inserted into disk drive unit 12, microprocessor 16 retrieves stored user settings associated with the disk from microprocessor memory unit 18, and the user is given the option of using the previously selected user settings. Using the previously selected user settings saves the user the time and trouble of reselecting viewing and listening preferences.

Optical disk system 10 also includes an audio/video decoder 20. Audio/video decoder 20 is coupled to disk drive unit 12 and microprocessor 16. Audio/video decoder 20 receives the encoded video and audio data from disk drive unit 12 along with the identification data and the user settings from microprocessor 16. Audio/video decoder 20 decodes the encoded video and audio data thereby producing decoded video and audio data. Audio/video decoder 20 stores the decoded video and audio data, the identification data, and the user settings within an audio/video (A/V) memory unit 22 coupled to audio/video decoder 20.

As will be described in more detail below, audio/video decoder 20 subsequently retrieves the decoded video data, the identification data, and the user settings from audio/video (A/V) memory unit 22, produces an output signal which is a combination of the decoded video data, the identification data, and the user settings, and provides the output signal to a video signal encoder 24 coupled to audio/video decoder 20. For example, the output signal may result in one or more menus being displayed upon a display device of optical disk system 10. Each menu may contain the identification data or the user settings superimposed upon decoded video data. Audio/video decoder 20 also retrieves decoded audio data from audio/video (A/V) memory unit 22, synchronizes the decoded video and audio data, and provides the audio data to an audio DAC 26 coupled to audio/video decoder 20.

Optical disk system 10 also includes two or more speakers 28 coupled to audio DAC 26 and a display device 30 coupled to video signal encoder 24. Audio DAC 26 receives digital audio data produced by audio/video decoder 20 and produces an analog audio signal from the digital audio data. The analog audio signal is coupled to speakers 28. Speakers 28 convert the electrical energy of the analog audio signal into sound energy. Display device 30 may be, for example, a television. Video signal encoder 24 receives the output signal produced by audio/video decoder 20 and produces an analog video signal, preferably according to a recognized standard television broadcast format (e.g., national television system committee or NTSC, phase alternate line or PAL, etc.). The analog video signal is coupled to display device 30. Display device 30 has a display screen and creates an image upon the display screen, wherein the image is dependent upon the analog video signal.

The encoded video and audio data of a DVD is organized into cells associated with multiple pictures or frames. A program is a group of cells, and a program chain is a collection of programs. The navigation data on a DVD controls playback of the presentation data. Each volume of a DVD may have one or more titles, wherein each title is used to designate a particular grouping of presentation data (e.g., a movie, etc.). A $Part_{13}$ of_Title is a navigation data construct which includes pointers or links to one or more program chains. The term "chapter" refers to the Part_of_ Title construct. A title on a DVD may have multiple program chains labeled as, for example, "chapter 5." These program chains may include different cells depending on, for example, selected camera angle and parental guidance. Although more information is required to designate a specific playback point, the term "chapter" will be used to designate a specific playback point when interfacing with the user.

FIG. 2 is a block diagram of one embodiment of microprocessor memory unit 18. Microprocessor memory unit 18 includes a volatile portion 32 and a non-volatile portion 34. Volatile portion 32 may include, for example, static random access memory (SRAM) which requires an uninterrupted supply of electrical power in order to maintain stored contents. Non-volatile portion 34 may include, for example, flash memory or electrically erasable programmable random access memory (EEPROM) which maintains stored contents even in the absence of applied electrical power.

FIG. 3 is a block diagram of one embodiment of a table 36 of disk specific information stored within non-volatile portion 34 of microprocessor memory unit 18 and maintained by microprocessor 16. Table 36 includes multiple entry locations, and each entry location is configured to store information pertaining to a particular optical disk. Each entry location includes a disk identification field and a specific settings field. The disk identification field may include, for example, a textual title, a portion of a textual title, or a numeric value. The specific settings field includes the viewing and listening preferences used the last time encoded video and audio data was retrieved from the disk.

At one byte per character, a textual title of a disk, or even a portion of the title, may be tens of bytes in length. A numeric value may be substituted for the title, or portion thereof, in order to reduce memory storage requirements. The numeric value may be, for example, an error detection code computed upon the disk identification data. A checksum is an example of such an err or detection code. A checksum may be computed by adding the contents of one or more of the fields of the primary volume descriptor of the optical disk, then performing a modulus operation upon the data. Using the above checksum calculation method to determine the contents of a 32-bit (4-byte) identification field, the odds of two different optical disks having identical checksums is about 1 in 4,300,000,000.

The specific settings field may include, for example, the calendar date the optical disk was last played and stored user settings including spoken language, video display format, audio volume setting, subtitle language, and a "last stop" playback location. The last stop playback location indicates where playback was stopped the last time the optical disk was inserted into disk drive unit 12.

FIG. 4 is a block diagram of one embodiment of a table 37 of user specific information stored within non-volatile portion 34 of microprocessor memory unit 18 and maintained by microprocessor 16. Table 37 includes multiple entry locations, and each entry location stores information pertaining to a particular user. Each entry location includes a user identification field and a specific settings field. The user identification field may include, for example, a user's first name or nickname, a portion of the user's first name or nickname, or a numeric value as described above. The specific settings field includes the viewing and listening preferences of the user.

When an optical disk is inserted into disk drive unit 12, microprocessor 16 receives the disk identification data (e.g., textual title) from disk drive unit 12. Microprocessor 16 searches table 36 within non-volatile portion 34 of microprocessor memory unit 18 for an entry with matching identification data in the identification field.

If an entry with matching identification data is not found in table 36 and table 37 is not empty, microprocessor 16 may, for example, cause a message similar to the following to be displayed:

"Use previously selected viewing/listening preferences?

1. Yes

2. No"

If the user answers yes (i.e., if the user presses a key labeled "1" on the numeric keypad of input device 14), microprocessor 16 may access table 37 and print the contents of valid (i.e., non-empty) user identification fields for user selection:

"Select one of the following:

1. Brian

2. Darren

3. Brett 4. (More)

5. (Cancel)"

If the user makes a selection corresponding to a displayed user identification field, microprocessor 16 may access table 37 and display the user specific settings for user review and approval.

If the user chooses not to use previously selected viewing and listening preferences, or if table 37 is empty, microprocessor 16 may prompt the user to enter viewing and listening preferences. After the user has entered his or her preferences, microprocessor 16 may ask the user if he or she wants to save the preferences. If the user answers yes, microprocessor 16 may prompt the user to enter a desired user identification string (e.g., a first name, a nickname, etc.). Microprocessor 16 may then select an entry location within table 37, save the user identification string within the user identification field of the entry location, and the user specific settings in the specific settings field of the entry location.

After the user specific settings have been obtained, microprocessor 16 may initialize the last stop playback location to a beginning location. Microprocessor 16 may then select an entry location for the disk within table 36, store the identification data in the disk identification field of the entry location, and store the current calendar date, the last stop playback location, and the user settings within the specific settings field of the entry location.

If an entry location with matching identification data is found within table 36, microprocessor 16 retrieves the calendar date, the last stop playback location, and the user settings from the specific settings field of the entry location. Microprocessor 16 provides the identification data, the calendar date, the last stop playback location, and the user settings to on-screen display unit 28 of audio/video decoder 24. The identification data, the calendar date, the last stop playback location, and the user settings are displayed upon a display screen of display device 30, and the user is given the option of resuming playback from the last stop playback location and with the previously selected user settings.

FIG. 5 is a block diagram of one embodiment of audio/video decoder 24. Audio/video decoder 24 includes a video decoder 26 and an on-screen display (OSD) unit 28. Video decoder 26 receives the encoded video and audio data from disk drive unit 12, and on-screen display unit 28 receives the identification data, the calendar date, the last stop playback location, and the user settings from microprocessor 16. Video decoder 26 decodes the encoded video data thereby producing decoded video data. Video decoder 26 stores the decoded video data within audio/video memory unit 22. On-screen display unit 28 may, for example, produce image data (e.g., bit-mapped textual characters) pertaining to the identification data, the calendar date, the last stop playback location, and the user settings, and store the image data within audio/video memory unit 22.

Audio/video memory unit 22 may include, for example, a frame buffer portion and an audio buffer portion. Video decoder 26 may store the decoded video data in the frame buffer portion. Audio/video decoder 24 may store decoded audio data in the audio buffer. On-screen display unit 28 may store image data pertaining to the identification data, the calendar date, the last stop playback location, and the user settings within the frame buffer portion such that the image data overwrites the decoded video data stored within the frame buffer portion video decoder 26. In this fashion, the image data produced by on-screen display unit 28 is superimposed upon the decoded video data. Audio/video decoder 24 may retrieve video data from the frame buffer portion, retrieve audio data from the audio buffer portion, synchronize the video and audio data, provide the video data to video signal encoder 24, and provide the audio data to audio DAC 26.

The optical disk may be, for example, a DVD, and the bitstream produced by disk drive unit 12 may be a DVD-compliant bitstream having a sub-picture unit (SPU) portion. The SPU portion of a DVD-compliant bitstream is used to convey graphical image data (e.g., text characters) to be displayed by superimposing the graphical image data upon a background image. Optical disk system 10 may take advantage of the display capabilities afforded by the SPU portion of the DVD-compliant bitstream. The frame buffer portion of audio/video memory unit 22 may include a decoded video portion and a sub-picture portion. Video decoder 26 may store decoded video data in the decoded video portion of the frame buffer portion, and on-screen display unit 28 may store produced image data within the sub-picture portion of the frame buffer portion. Audio/video decoder 24 may retrieve video data from both the decoded video portion and the sub-picture portion of the frame buffer portion, superimpose the image data from the sub-picture portion upon the video data from the decoded video portion, and provide the resultant video data as an output signal to video signal encoder 24.

FIG. 6 is a block diagram of one embodiment of display device 30, wherein display device 30 includes a display screen 38, and wherein exemplary image data produced by on-screen display unit 28 is displayed upon display screen 38. In FIG. 6, the disk is identified by title information obtained from the disk on the first line of the displayed information. The last stop playback location is displayed on the second line of the displayed information as a calendar date including month, day, and year. Lines 3–6 of the displayed information indicate the spoken language, video display format, audio volume setting, and subtitles selected by the user the last time the disk was inserted into disk drive unit 12. The last stop playback location is displayed on line 7 of the displayed information. As described above, the last stop playback location indicates where playback was stopped the last time the optical disk was inserted into disk drive unit 12.

Following the display of the information data, the user settings, and the last stop playback location, the user may be prompted with a question like:

"Restart from the last stop point?

1. Yes

2. No"

If the user answers yes, viewing may be continued from the point of interrupted playback. Following user input answering the above question, the user may be prompted with a question like:

"Use previous audio and video settings?

1. Yes

2. No"

If the user answers yes to the second question, the previously selected viewing and listening preferences may be invoked, saving the user the time and trouble of reselecting the audio and video preferences. If the user answers no, and table 37 is not empty, microprocessor 16 may ask if the user wishes to use previously selected viewing and listening preferences. If the user chooses not to use previously selected viewing and listening preferences, or if table 37 is empty, microprocessor 16 may prompt the user to enter viewing and listening preferences as described above.

When the optical disk is a DVD, saving the last stop playback location may require saving information about the physical data structure of the disk and the presentation data structure. The physical data structure includes the basic video and audio data, while the presentation data structure includes information about how the video and audio data should be played. For example, A DVD optical disk may include only a single title and a physical data structure including the basic video and audio data. However, the presentation data structure may contain several programs which replay different sequences of the video and audio data to reflect different camera angles, different chapter orderings, or the skipping of certain chapters based upon the parental management setting. More information about how data is organized upon a DVD may be obtained from *DVD Demystified* by Jim Taylor (1998, McGraw-Hill, Inc., New York, ISBN 0-07-064841-7).

The saving of a last stop playback location for a DVD may require saving the following location information about the physical stop point: (1) the title number from the video title set (VTS), (2) the video object set (VOBS) number, (3) the video object number (VOB), (4) the cell, and (5) the video object unit (VOBU). The saving of the last stop playback location for a DVD may also require saving the following presentation data information: (1) program chain (PGC) number, and (2) the program (PG) number.

The present method for controlling the operation of optical disk system 10 thus includes obtaining identification data from the optical disk when the optical disk is inserted into disk drive unit 12. The identification data may be, for example, a portion of a title of the optical disk, and may be obtained by scanning the optical disk using disk drive unit 12. User settings are then obtained from table 37 or input device 14. As described above, the user settings may include the spoken language, the video display format, the audio volume setting, and the subtitle language. The identification data and the user settings are then stored within non-volatile portion 34 of microprocessor memory unit 18.

Microprocessor 16 may maintain table 36 of optical disk specific settings and table 37 of user specific settings within non-volatile portion 34 of microprocessor memory unit 18 as described above. When an optical disk is inserted into disk drive unit 12, microprocessor 16 receives disk identification data from disk drive unit 12. Microprocessor 16 may determine if the optical disk has been inserted into disk drive unit 12 before by searching for matching identification data with the identification fields of each entry in table 36. If a match is found, the optical disk has been inserted into disk drive unit 12 before, and the user settings may be retrieved from the disk specific settings field of the corresponding entry in table 36.

If a match is not found, or if the user chooses not to use the previous settings, the user settings may be obtained from table 37 or via input device 14. Once user settings are obtained, they may be saved in non-volatile portion 34 of microprocessor memory unit 18 as described above, and retrieval of presentation data (i.e., encoded audio and video data) from the optical disk may be initiated.

If playback of the presentation data is stopped before an end of the presentation data is reached, optical disk system 10 may store the identification data, the user settings, and last stop playback location within non-volatile portion 34 of microprocessor memory unit 18. The next time the optical disk is inserted into disk drive 12, the information data, the user settings, and the last stop playback location will be displayed, and the user may be asked if playback should be restarted from the last stop point. If the user answers yes, viewing may be continued from the point of interrupted playback. The user may then be asked if the previous audio and video settings should be used. If the user answers yes to the second question, the previously selected viewing and listening preferences may be invoked, saving the user the time and trouble of reselecting the audio and video preferences as described above. If the user answers no, and table 37 is not empty, the user may be asked if previously selected viewing and listening preferences are to be used. If the user chooses not to use previously selected viewing and listening preferences, or if table 37 is empty, the user may be prompted to enter viewing and listening preferences as described above.

A sleep timer function may also be employed to detect when a user falls asleep during playback. During playback, a visual signal (e.g., an icon) may be periodically displayed (e.g., every 30 minutes) within a portion of display screen 38 of display device 30. The user must respond to the visual signal (e.g., by pressing one or more keys of a keypad of input device 14) within a predetermined amount of time (e.g., 5 minutes) in order for playback to continue. The visual signal may be displayed in, for example, a corner of display screen 38. The time interval between displays of the visual signal are determined by a first timer. A second timer determines the required response time. Display of the visual signal starts the second timer. The first and second timers may be implemented in hardware or software.

FIG. 7 is a block diagram of display device 30 showing candidate locations for display of the visual signal upon display screen 38. The visual signal may be displayed within a lower right-hand corner 42 of display screen 38. Alternately, the visual signal may be displayed in one of the other three corners 44 of display screen 38.

When a sleep timer mode is activated, the first and second timers are enabled. The first timer is activated when playback is initiated. When the first timer indicates a first predetermined period of time has elapsed (e.g., 30 minutes), the visual signal is displayed and the second timer is activated. Microprocessor 16 initiates display of the visual signal by providing data pertaining to the visual signal to on-screen display unit 28. On-screen display unit 28 produces image data and stores the image data within audio/video memory unit 22. Audio/video decoder 20 retrieves the image data from audio/video memory unit 22, incorporates the image data into the output signal, and provides the output signal to video signal encoder 24.

Each time the user responds to the visual signal via input device 14 within the predetermined time period of the second timer (e.g., 5 minutes), microprocessor 16 stores the current playback location as the last stop playback location within non-volatile portion 34 of microprocessor memory unit 18. Microprocessor 16 directs on-screen display unit 28 to stop producing image data, the visual signal disappears from display screen 38 of display device 30, and playback continues.

If the user fails to respond to the visual signal via input device 14 within the predetermined time period of the second timer, optical disk system 10 assumes the user is asleep. Microprocessor 16 stops playback and interrupts the supply of electrical power to the other components (i.e., shuts down optical disk system 10). Non-volatile portion 34 of microprocessor memory unit 18 holds the disk identification data, the user settings, and the last stop playback location stored the last time the user responded to the visual signal. The next time the disk is inserted into disk drive unit 12, the user will be asked if playback should be continued from the location corresponding to the last time the user responded to the visual signal (i.e., just before the user fell asleep).

Numerous variations and modifications will become apparent to those skilled in the art once the above disclosure is fully appreciated. It is intended that the following claims be interpreted to embrace all such variations and modifications.

What is claimed is:

1. An optical disk system, comprising:
   a disk drive unit for retrieving identification data and encoded video data stored upon an optical disk;

an input device for inputting user settings; and a memory unit operably coupled to the disk drive unit and the input device and including a non-volatile portion for storing the identification data and the user settings, and wherein the memory unit is further configured to store information indicating if retrieval of encoded video data stored upon the optical disk was interrupted the last time the optical disk was inserted into the drive unit.

2. The optical disk system as recited in claim 1, wherein the optical disk is a DVD.

3. The optical disk system as recited in claim 1, wherein the identification data comprises a portion of a title of the optical disk.

4. The optical disk system as recited in claim 1, wherein the input device includes a numeric keypad.

5. The optical disk system as recited in claim 1, wherein the user settings comprise a video display format and an audio volume setting.

6. The optical disk system as recited in claim 1, wherein the identification data is associated with the user settings within the non-volatile portion of the memory unit.

7. The optical disk system as recited in claim 1, wherein the non-volatile portion of the memory unit comprises flash memory.

8. The optical disk system as recited in claim 1, further comprising:

a microprocessor coupled to receive the identification data from the disk drive unit and the user settings from the input device, wherein the microprocessor is coupled to the memory unit, and wherein the microprocessor is configured to: (i) store the identification data and the user settings within the non-volatile portion of the memory, and (ii) provide the identification data and the user settings; and an audio/video decoder coupled to receive the encoded video data from the disk drive unit and the identification data and user settings from the microprocessor, wherein the audio/video decoder is configured to produce an output signal comprising the identification data and the user settings.

9. The optical disk system as recited in claim 8, wherein the audio/video decoder comprises:

a video decoder coupled to receive the encoded video data from the disk drive and configured to decode the encoded video data thereby producing decoded video data; and an on-screen display unit coupled to receive the identification data and user settings from the microprocessor and configured to produce image data comprising the identification data and the user settings.

10. A method for controlling the operation of an optical disk system comprising a disk drive unit for retrieving data stored upon an optical disk, an input device for inputting user settings, and a memory unit having a non-volatile portion, the method comprising:

obtaining identification data from the optical disk when the optical disk is inserted into the disk drive unit;

obtaining user settings;

determining if retrieval of encoded video data stored upon the optical disk was interrupted the last time the optical disk was inserted into the drive unit; and storing the identification data and the user settings within the non-volatile portion of the memory unit.

11. The method as recited in claim 9, wherein the optical disk is a DVD.

12. The method as recited in claim 9, wherein the identification data comprises a portion of a title of the optical disk.

13. The method as recited in claim 9, wherein the obtaining of the identification data comprises using the disk drive unit to scan the optical disk to obtain the identification data.

14. The method as recited in claim 9, wherein the user settings comprise a video display format and an audio volume setting.

15. The method as recited in claim 9, wherein the user settings are stored within the non-volatile portion of the memory unit, and wherein obtaining of the user settings comprises retrieving the user settings from the non-volatile portion of the memory unit.

16. The method as recited in claim 9, wherein the user settings are obtained via the input device.

17. The method as recited in claim 9, wherein the storing is performed such that the identification data is associated with the user settings.

18. A method for controlling the operation of an optical disk system comprising a disk drive unit for retrieving data stored upon an optical disk, an input device for inputting user settings, and a memory unit having a non-volatile portion, the method comprising:

obtaining identification data from the optical disk when the optical disk is inserted into the disk drive unit;

determining if the optical disk has been inserted into the disk drive unit before;

determining if retrieval of encoded video data stored upon the optical disk was interrupted the last time the optical disk was inserted into the drive unit; and retrieving user settings associated with the optical disk if the optical disk has been inserted into the disk drive unit before.

19. The method as recited in claim 18, wherein the optical disk is a DVD.

20. The method as recited in claim 18, wherein the identification data comprises a portion of a title of the optical disk.

21. The method as recited in claim 18, wherein the obtaining comprises using the disk drive unit to scan the optical disk to obtain the identification data.

22. The method as recited in claim 18, wherein the determining comprises searching a table of identification data and associated user settings stored within the non-volatile portion of the memory unit.

23. The method as recited in claim 18, further comprising obtaining user settings if the optical disk has not been inserted into the disk drive unit before.

24. The method as recited in claim 23, wherein the obtaining of the user settings comprises using the input device to obtain user settings.

25. A method for controlling the operation of an optical disk system comprising a disk drive unit for retrieving data stored upon an optical disk, an input device for inputting user settings, and a memory unit having a non-volatile portion, the method comprising:

obtaining identification data from the optical disk when the optical disk is inserted into the disk drive unit;

obtaining user settings;

determining if retrieval of encoded video data stored upon the optical disk was interrupted the last time the optical disk was inserted into the drive unit;

initiating retrieval of encoded video data stored upon the optical disk; and storing the identification data, the user settings, and last stop information within the non-volatile portion of the memory unit if retrieval of the encoded video data is interrupted before an end of encoded video data is detected.

26. The method as recited in claim 25, wherein the optical disk is a DVD.

27. The method as recited in claim 25, wherein the identification data comprises a title of the optical disk.

28. The method as recited in claim 25, wherein the obtaining of the user settings comprises:

determining if the optical disk has been inserted into the disk drive unit before; and retrieving user settings associated with the optical disk if the optical disk has been inserted into the disk drive unit before.

29. The method as recited in claim 25, wherein the user settings comprise a video display format and an audio volume setting.

30. The method as recited in claim 25, wherein the last stop information comprises information defining the location on the optical disk where retrieval of the encoded video data was interrupted.

31. The method as recited in claim 25, wherein the storing is performed such that the identification data is associated with the user settings and the last stop information.

32. A method for controlling the operation of an optical disk system comprising a disk drive unit for retrieving data stored upon an optical disk, an input device for inputting user settings, a memory unit having a non-volatile portion, and a display device, the method comprising:

obtaining identification data from the optical disk when the optical disk is inserted into the disk drive unit;

obtaining user settings;

determining if retrieval of encoded video data stored upon the optical disk was interrupted the last time the optical disk was inserted into the drive unit;

initiating retrieval of encoded video data stored upon the optical disk;

periodically displaying a visual signal via the display device prompting the user to respond via the input device; and storing the identification data, the user settings, and last stop information within the non-volatile portion of the memory unit if the user does not respond to the visual signal within a predetermined period of time.

33. The method as recited in claim 32, wherein the visual signal is an image projected upon a portion of a display screen of the display device.

34. A method for controlling the operation of an optical disk system comprising a disk drive unit for retrieving data stored upon an optical disk, an input device for inputting user settings, and a memory unit having a non-volatile portion, the method comprising:

obtaining identification data from the optical disk when the optical disk is inserted into the disk drive unit;

determining if retrieval of encoded video data stored upon the optical disk was interrupted the last time the optical disk was inserted into the drive unit; and performing the following if the retrieval of encoded video data was previously interrupted:

retrieving last stop information and user settings associated with the optical disk, wherein the last stop information comprises information defining the location on the optical disk where retrieval of the encoded video data was previously interrupted; and reinitiating the retrieval of encoded video data at the location indicated by the last stop information.

* * * * *